United States Patent [19]

Sauer et al.

[11] Patent Number: 4,516,204
[45] Date of Patent: May 7, 1985

[54] OPTICAL PASSIVE BUS CONTROL SYSTEM

[75] Inventors: Anton Sauer; Hans Thinschmidt, both of Germering, Fed. Rep. of Germany

[73] Assignee: Siemens Aktiengesellschaft, Berlin & Munich, Fed. Rep. of Germany

[21] Appl. No.: 382,666

[22] Filed: May 27, 1982

[30] Foreign Application Priority Data

Jun. 12, 1981 [DE] Fed. Rep. of Germany ....... 3123448

[51] Int. Cl.³ .................. G06F 3/04; G06F 15/16; G02B 5/14
[52] U.S. Cl. .................................. 364/200; 350/96.16
[58] Field of Search ................ 364/200, 900; 350/96.15, 96.16; 455/601, 602, 612

[56] References Cited

U.S. PATENT DOCUMENTS

| 4,063,220 | 12/1977 | Metcalfe et al. | 370/93 X |
| 4,249,266 | 2/1981 | Nakamori | 350/96.16 X |
| 4,366,565 | 12/1982 | Herskowitz | 350/96.16 X |
| 4,390,944 | 6/1983 | Quackenbush et al. | 364/200 |
| 4,422,179 | 12/1983 | Albanese | 455/601 |
| 4,430,699 | 2/1984 | Segarra et al. | 350/96.16 X |
| 4,446,515 | 5/1984 | Sauer et al. | 350/96.16 X |

OTHER PUBLICATIONS

Taylor et al., "Data Busing with Fiber Optics", Naval Electronics Laboratory Center, Feb. 1975, pp. 12-24.

Primary Examiner—Gareth D. Shaw
Assistant Examiner—Ronni S. Malamud
Attorney, Agent, or Firm—Hill, Van Santen, Steadman & Simpson

[57] ABSTRACT

An optical passive bus control system includes an access coordinator and control unit which is connected to the passive network in the same manner as other connected devices of the network. The access coordinator control means is located spatially close to the optical mixer, over connecting light wave guides which are as short as possible. The access coordinator and control unit contains a collision recognition device for recognizing an access collision, and includes means for implementing an asynchronous access operating mode in response to a collision recognition. A switch means is provided for emitting a signal to the bus, signifying a change to a synchronous operating mode in which no access collisions can occur.

15 Claims, 2 Drawing Figures

OPTICAL PASSIVE BUS CONTROL SYSTEM

BACKGROUND OF THE INVENTION

1. Field of the Invention

The present invention relates to an arrangement for controlling the bus access of a plurality of devices sharing one bus in a network with at least one optical mixer constructed as a passive bus system, particularly for multi-computer systems. The devices employing the bus can be subscribers exchanging information among each other, such as individual computers of a multi-computer system.

2. The Prior Art

In passive bus systems, no preconditions are undertaken within the bus in order to permit communication among the connected devices. The connected devices may be, for example, individual computers of a multi-computer system, and no attempt is made to give any of the connected devices special priorities. Each station is of equal priority. When requests for communications simultaneously occur from several stations, measures must be taken to insure that only one station can access the bus, since with simultaneous transmission, super positon of simultaneous transmissions causes the data transfer to be falsified.

Various procedures have been applied in known bus systems, in which the access to the bus are decentrally sequenced by the individual stations. The best known access method which is also employable for optical couplers is the CSMA/CD method (Carrier Sense Multiple Access with Collision Detection). This method is carried on completely decentrally with a passive bus system.

BRIEF DESCRIPTION OF THE INVENTION

A principal object of the present invention is to provide an arrangement for controlling bus access which is simple in construction and arrangement, and which can control the bus access in either a synchronous or an asynchronous mode. The operating mode is controlled, on a case by case basis, as a result of specific operating conditions, such as the occurrence of a heavy traffic load. Changing over from asynchronous to synchronous operating mode at such times avoids access collisions and speeds error free exchange of information.

In the present invention, this object is achieved by an arrangement including an optical mixer constructed as a passive bus system, with an access coordinator and control means connected to the mixer to receive random light signals therefrom and to transmit random light signals thereto, such access coordinator and control means being connected over the shortest possible light wave guide and adapted to select between an asynchronous and a synchronous operating mode for the bus access on a case by case basis, as a result of specific operating conditions of the passive bus system.

The present invention achieves the advantage that a high degree of freedom is provided, as a rule, for accesses to the bus or the individual stations or devices. Thus, each of the individual devices can ordinarily emit its information and requests without delay, and it is only in exceptional cases, such as briefly occurring high traffic loads, that synchronous operation is induced and carried out in order to guarantee error free information flow.

These and other objects and advantages of the invention will become manifest by an inspection of the following description and accompanying drawings.

BRIEF DESCRIPTION OF THE DRAWINGS

Reference will now be made to the accompanying drawings in which.

DESCRIPTION OF THE PREFERRED EMBODIMENTS

Figure 1:
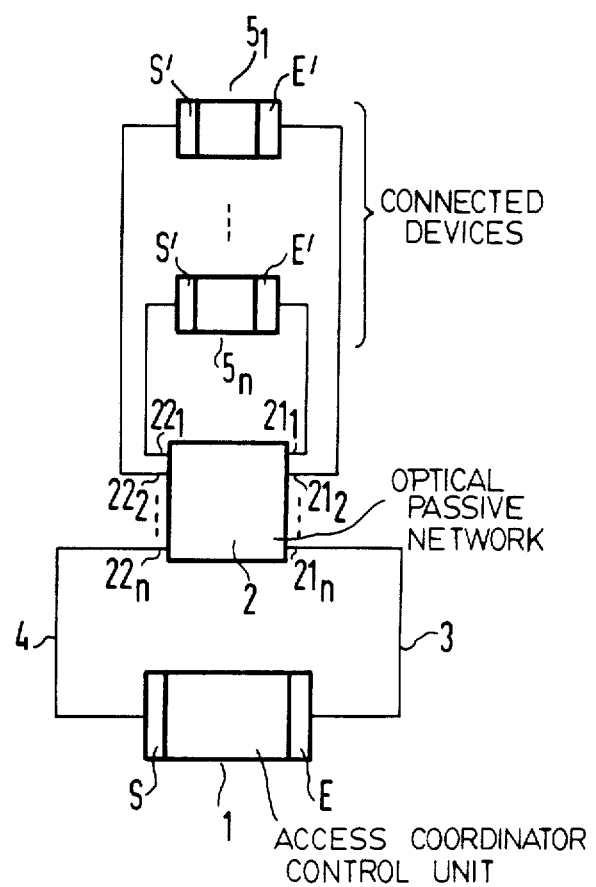
FIG. 1 is a functional block diagram of a system incorporating an optical passive bus, and incorporating an illustrative embodiment of the present invention.

FIG. 1 shows an access coordinator control unit 1 which is connected to an optical passive network 2 over a plurality of light signal transmission lines. The lines $21_1$ through $21_n$ convey light output signals from the network 2 over light waveguides to light signal receivers associated with an access coordinator control unit 1, and a plurality of other devices $5_1$ through $5_n$. Each of these units produces light signals from a light signal transmitter which are connected to the network 2 over light signal transmission lines $22_1$ through $22_n$. In the case of the access coordinator control unit, a light signal receiver E and a light signal transmitter S are employed. Each of the other devices has an equivalent light signal receiver E' and a light signal transmitter S'.

Figure 2:
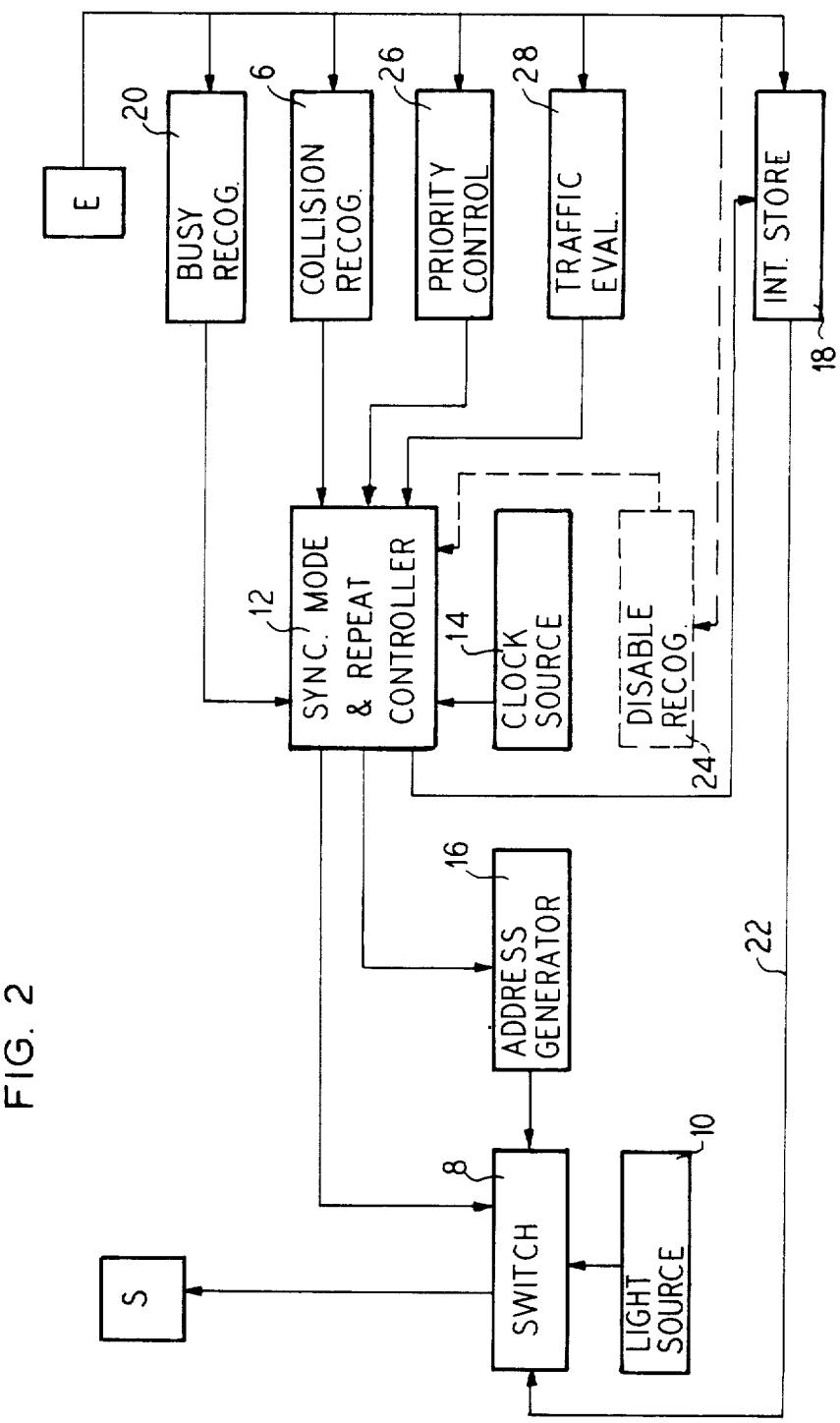
FIG. 2 is a functional block diagram of the access coordination and control unit of FIG. 1.

The network 2 represents an optical coupling system which is known per se and which consists, for example, of one or more star couplers. By means of the couplers, the light signals on all of the inputs $22_1$ through $22_n$ are available at each of the outputs $21_1$ through $21_n$, and in this way, any of the connected devices may communicate with any other connected device. With this structure, each of the devices $5_1$ through $5_n$ has free access to the network 2, which represents a passive bus system. As is known, this can lead to access collisions, and thus to falsifications of the transmitted information, with a probability which depends on the existing traffic load. In order to avoid malfunctions resulting from access collisions, the access coordinator control unit 1 contains a collision recognition device 6 (FIG. 2). The collision recognition device 6 is connected to the light signal receiver E, and examines signals simultaneously present thereon, to determine whether two or more signal transmitters S' are simultaneously transmitting signals onto the bus system. This determination may be made by comparing the received light intensity with a standard value, or by examining parts of the transmitted information (such as parity bits) which indicate a malfunction such as simultaneous transmission from two or more devices.

When the collision recognition device 6 recognizes an access collision, a switch 8 is activated to transmit a signal from a light source 10 onto the bus system through the light signal transmitter S. The signal from the light source 10 is a special signal and may be a continuous light. Each of the connected devices $5_1$ through $5_n$ is provided with means for detecting a special signal, by which the necessary steps can be taken (such as retransmission of access codes or data), to prevent the loss of any data as a result of the collision. Alternatively, the light produced by the light source 10 can be light of a wave length which is not identical to the wave lengths of standard signals emitted by the connected devices $5_1$ through $5_n$. In this case, each of the connected devices is provided with means for detecting a light signal with the non-standard wave length, to identify that a collision has occurred. As another alternative, the special light signal produced by the light source 10, may have an increased intensity relative to standard signals.

In normal operation, the connected devices $5_1$ through $5_n$ each have access to the passive bus by means of a known asynchronous operating mode, and when an access collision has occurred, address information and/or data is retransmitted as required.

When a predetermined minimum frequency of access collisions occurs, such as during high traffic periods, the access coordinator control unit 1 changes over the operating mode to a synchronous operating mode. In the synchronous mode, the individual devices $5_1$ through $5_n$ are released for access to the passive bus, one at a time, under control of the access coordinator and control unit 1. In this way no access collisions can occur during the synchronous mode. Preferably, in the synchronous operating mode, the access coordinator control unit 1 releases the bus accesses according to a prescribed priority. Each of the devices $5_1$ through $5_n$ may be assigned an individual, or a group priority, so that access to the bus for units with higher priorities can be accomplished prior to accesses of units with lower priorities.

According to a further aspect to the present invention, the distribution of releases for access to the bus by the connected devices $5_1$ through $5_n$ is made dependent upon the existing traffic code from time to time, in a manner known per se. For that purpose, a computer can be advantageously provided as a part of the access coordinator control means 1 for identifying and evaluating the traffic load.

The known CSMA/CD method can be employed for the asynchronously operating mode which is carried out in the case of the lower average traffic load between connected devices. This method is described, for example, by Shoch and Hupp, in "Performance of an Ethernet Local Network⇌, Local Area Communications Network Symposium, Boston, May, 1979.

A further feature of the present invention provides that in the case of an operating disruption of the access coordinator control unit 1, one of the connected devices, for example, $5_1$ assumes a function of the access coordinator control unit. For that purpose, the device $5_1$ is programmed in a known manner to recognize the failure of the access coordinator control unit 1, and to assume its function when such failure is recognized. The device $5_1$, when carrying on the function of the access coordinator control unit, functions with longer control times than the normal access coordinator control means 1, to account for longer transit times through the light wave guides which connect with the passive network 2. These wave guides are necessarily longer than the wave guides 3 and 4, which connect the access coordinator control unit 1 with the network 2, for these waveguides 3 and 4 are arranged with the shortest possible lines.

Another feature of the present invention involves a memory, by which information passing through the passive bus 2 is intermediately stored, so that in case a receiving device is not prepared to receive, the access coordinator control unit can transmit the data after the receiving device becomes ready.

Referring to FIG. 2, the collision recognition device unit 6 is connected to a synchronous mode and repeat controller 12, which is also connected to a source of clock pulses 14. The frequency of the pulses from the clock source 14 controls operation of the system in a synchronous mode. An output of the unit 12 is connected to an input of an address generator 16, by which the addresses of the interconnected units $5_1$ through $5_n$ are passed on to the passive bus, through the switch 8 and the transmitter S, to allow an addressed unit to have access to the bus. The sequence of addresses of connected units which are released for bus access is controlled by priority control unit 26, which stores signals representative of connected units seeking access to the bus, and releases them to the controller 12 in order of their priority, so that units with the highest priority are served first.

An intermediate storage unit 18 is connected to receive signals from the light signal receiver E, and stores such signals intermediately, so that they can be retransmitted in case the receiving device is busy and not able to receive the transmitted signals. This fact is indicated by a busy recognition unit 20, which also receives signals from the passive bus over the light signal receiver E. When a busy condition is recognized, the controller 12 is caused to access the portion of the intermediate storage device 18 which contains the information to be retransmitted, and this information is read out at the appropriate time over the line 22 through the switch 8 to the light signal transmitter S.

As described above, the connecting unit $5_1$ is able to take over the function of the access coordinator control unit 1, when the latter is disabled. The elements already mentioned above in connection with FIG. 2 are also incorporated in the unit $5_1$, so that it can function in this capacity. In addition, the unit $5_1$ includes a disability recognition device 24, by which it recognizes a condition of disability of the access coordinator and control unit 1. The unit 24 is shown in dashed lines in FIG. 2, to indicate that it is not a required part of the unit 1. The disability recognition device 24 may be connected directly to the light signal receiver E, in which case it recognizes a collision access situation which is not being controlled by the access coordinator control unit 1, thus signifying a failure in that unit. Alternatively, the unit 24 may be connected directly to the unit 1 to sense immediately any failure of operation of the unit 1.

A traffic evaluator computer 28 is also connected to the light signal receiver E, to recognize when the frequency of collision exceeds a predetermined level. Low frequency collisions are handled individually by the connected units, which recognize the special light signal from the light source 10, signifying a collision, and respond to such signal by retransmitting the information with which the collision interferred. When the collision frequency becomes greater than the predetermined level, however, this fact is recognized by the traffic evaluator computer 28, which controls the unit 12 to select the synchronous mode. Operation remains in the synchronous mode until the collision frequency again drops below the predetermined level.

It will be apparent to those skilled in the art that various modifications and additions may be made in the apparatus and method of the present invention, without departing from the essential features of novelty thereof, which are intended to be defined and secured by the appended claims.

We claim as our invention:

1. A bus control arrangement for controlling the access to an optical passive bus by a plurality of connected devices which are connected to said bus, comprising an access coordinator control means, said access coordinator control means having a light signal receiver unit and a light signal transmitter unit, first connecting means connecting said access coordinator control means with said bus over a first light signal transmission line, whereby outputs of said connected devices are connected to said light signal receiver unit, second connecting means connecting said access coordinator control means with said bus over a second light signal transmission line, whereby the output of said light signal transmitter is connected to the light signal inputs of said connected devices, said first and second connecting means comprising light wave guides having the shortest possible length, said access coordinator control means having means responsive to specific operating conditions on said passive bus for selectively selecting an asynchronous of a synchronous operating mode for access to the bus by said connected devices.

2. Apparatus according to claim 1, wherein said access coordinator control means includes a collision recognition device for producing an output in response to two or more signal transmitters simultaneously transmitting signals onto said bus.

3. Apparatus according to claim 2, wherein said access coordinator control means includes switch means for transmitting a special signal onto said bus after said collision recognition device has indicated an access collision.

4. Apparatus according to claim 3, wherein said special signal is continuous light.

5. Apparatus according to claim 3, wherein said bus transmits a plurality of light signals of a first wave length between said connected devices, and wherein said special signal is light of a wave length which is not equal to said first wave length.

6. Apparatus according to claim 3 wherein said bus transmits light signals have a first intensity level between said connected devices, and wherein said special signal is a light signal having an increase of level relative to said first level.

7. Apparatus according to claim 1, wherein said access coordinator control means includes a memory for intermediately storing information passing over said bus, whereby said information can be retransmitted by said access coordinator control means to one of said connected devices which is not prepared for reception when said information first passes over said bus.

8. Apparatus according to claim 1, wherein one of said connected devices incorporates determining means for determining when said access coordinator control means is not operating properly, and means connected to said determining means and operative in response thereto for subsequently performing the functions of said access coordinator control means.

9. Apparatus according to claim 8 including a computer for evaluating said frequency, and for controlling release of said connected unit for access of said bus.

10. Apparatus according to claim 1 including means for sensing the frequency of access collisions on said bus, and for distributing releases for said connected devices to access said bus in dependence thereon.

11. Apparatus according to claim 10, including means for operating said one connected device with a lower repetition rate, relative to said access coordinator control means, in order to compensate for longer transit times through the light wave guides connecting said one connected unit to said bus.

12. A method of operating an optical passive bus system made up of a bus and a plurality of connected devices connected to said bus, including the steps of normally allowing access to said bus from said connected devices by means of an asynchronous operating mode, recognizing a predetermined frequency of access collisions, and changing over to a synchronous operating mode in response to recognition of a frequency of access collisions greater than said predetermined frequency, said connected devices being released for access to said bus during said synchronous operating mode one at a time, whereby no access collision can occur from simultaneously pending access requests from more than one of said connected devices.

13. The method of claim 12, including the step of releasing said connected devices for access to said bus according to a predetermined priority list, during said synchronous operating mode.

14. The method according to claim 13, including the step of assigning a priority to each of said connected devices, whereby devices with high priorities can be accorded access releases with less delay than lower priority devices.

15. The method according to claim 12, including the step of using a CSMA/CD method for the asynchronous operating mode.

* * * * *